(12) United States Patent
Okada et al.

(10) Patent No.: US 7,796,838 B2
(45) Date of Patent: Sep. 14, 2010

(54) IMAGING APPARATUS, PROCESSING METHOD OF THE APPARATUS MAKING COMPUTER EXECUTE THE METHODS OF SELECTING FACE SEARCH DIRECTIONS SPECIFIC TO A DISPLAY MODE AND CAPTURE MODE OF OPERATION

(75) Inventors: Miyuki Okada, Kanagawa (JP); Yoshihiro Suzuki, Kanagawa (JP)

(73) Assignee: Sony Corporation (JP)

( * ) Notice: Subject to any disclaimer, the term of this patent is extended or adjusted under 35 U.S.C. 154(b) by 970 days.

(21) Appl. No.: 11/471,076

(22) Filed: Jun. 20, 2006

(65) Prior Publication Data

US 2006/0285750 A1  Dec. 21, 2006

(30) Foreign Application Priority Data

Jun. 21, 2005  (JP) .............................. 2005-181320

(51) Int. Cl.
| | |
|---|---|
| G06K 9/36 | (2006.01) |
| G06K 9/62 | (2006.01) |
| G06K 9/74 | (2006.01) |
| G06K 9/00 | (2006.01) |
| G09G 5/00 | (2006.01) |

(52) U.S. Cl. ..................... 382/291; 382/289; 382/228; 382/118; 382/103; 345/659

(58) Field of Classification Search ................. 382/190, 382/103, 118, 276–308
See application file for complete search history.

(56) References Cited

U.S. PATENT DOCUMENTS

| 6,597,817 B1 | 7/2003 | Silverbrook |
| 6,940,545 B1* | 9/2005 | Ray et al. ................. 348/222.1 |
| 7,565,030 B2* | 7/2009 | Steinberg et al. ............ 382/296 |
| 2004/0022435 A1* | 2/2004 | Ishida ......................... 382/190 |
| 2005/0046730 A1* | 3/2005 | Li .......................... 348/333.12 |

FOREIGN PATENT DOCUMENTS

| CN | 1414514 A | 4/2003 |
| JP | 09-171560 A | 6/1997 |
| JP | 09-281605 A | 10/1997 |
| JP | 2000-137788 A | 5/2000 |
| JP | 2003-271933 A | 9/2003 |
| JP | 2004-062565 A | 2/2004 |

OTHER PUBLICATIONS

Office Action from Chinese Application No. 2006-10086466.3 dated Nov. 16, 2007.

\* cited by examiner

*Primary Examiner*—Tom Y Lu
*Assistant Examiner*—Thomas A Conway
(74) *Attorney, Agent, or Firm*—Lerner, David, Littenberg, Krumholz & Mentlik, LLP

(57) ABSTRACT

An imaging apparatus includes face detection means for searching image data from at least one direction to detect a face portion in the image data; capture mode search direction instruction means for instructing a search direction of the image data to the face detection means in a capture mode, which is a mode of recording the image data; and monitoring mode search direction instruction means for instructing the search direction of the image data to the face detection means in a monitoring mode, which is a mode of displaying the image data.

16 Claims, 9 Drawing Sheets

IMAGING APPARATUS, PROCESSING METHOD OF THE APPARATUS MAKING COMPUTER EXECUTE THE METHODS OF SELECTING FACE SEARCH DIRECTIONS SPECIFIC TO A DISPLAY MODE AND CAPTURE MODE OF OPERATION

CROSS-REFERENCE TO RELATED APPLICATIONS

The present application claims priority from Japanese Patent Application No. JP 2005-181320 filed on Jun. 21, 2005, the disclosure of which is hereby incorporated by reference herein.

BACKGROUND OF THE INVENTION

The present invention relates to an imaging apparatus detecting a face portion included in image data, and more particular to an imaging apparatus changing the detection method of the face portion according to an operation state, a processing method in each imaging apparatus and a program making a computer execute the method.

In recent years, a digital still camera capable of imaging not only an original still image but also a moving image has rapidly spread. These digital still cameras have become highly efficient, and especially detection/recognition system techniques have been watched. The representative technique of the detection/recognition system techniques is a face detection technique.

Now, when a subject is imaged with a digital still camera, imaging is frequently performed with the digital still camera inclined in various directions. Imaging is frequently performed with a digital camera long from side to side rotated by "90 degrees", for example. As to such rotations of a digital still camera, a "0 degree" rotation, a "+90 degree" rotation, a "−90 degree" rotation and a "180 degree" rotation are supposed when a clockwise rotation is supposed to be a positive direction. Conventionally, as to the rotation of the digital still camera, a technique of inputting the information related to the direction of a rotation, for example a "+90 degree" rotation, to detect a face portion using the image data obtained by an imaging based on the input rotation direction has been proposed (see, for example, Patent Document 1). Moreover, a technique of counting the number of face portions when there is a plurality of face portions detected from image data, to use the number for extra copies of a photograph has been also proposed (see, for example, Patent Document 2).

[Patent Document 1] Japanese Patent Application Publication No. 2004-62565 (at FIG. 1)

[Patent Document 2] Japanese Patent Application Publication No. Hei 9-281605 (at FIG. 1)

However, the above technique of inputting the information of the direction of a rotation to detect a face portion in the image data imaged based on the input rotation direction requires the previous input of the rotation direction, and consequently the operation is troublesome. For detecting the face portion from the image data without performing such an operation, it is conceivable to search for the face portion of the image data from all of the rotation directions in consideration of all cases of imaging after "0 degree" rotation, "+90 degree" rotation, "−90 degree" rotation and "180 degree" rotation. But that method requires plenty of time, and is not realistic. On the other hand, at the time of searching for image data in face detection, if, for example, only the "0 degree" rotation and the "+90 degree" rotation are performed without considering all the cases of the imaging after the "0 degree" rotation, the "+90 degree" rotation, the "−90 degree" rotation and the "180 degree" rotation, then it would be possible to perform high speed face detection. But, in that case, the case where no face portions can be detected may increase, and it is apprehended that a detection rate decreases.

Moreover, if the information obtained at the time of detecting a face portion from image data can be recorded as the information accompanying the image of the image data in association with the image data, it becomes possible to retrieve already recorded image data from various viewpoints.

SUMMARY OF THE INVENTION

Consequently, there is a need for an imaging apparatus which detects a face portion from image data at high speed efficiently.

According to an embodiment of the present invention, there is provided an imaging apparatus including face detection means for searching image data from at least one direction to detect a face portion in the image data; capture mode search direction instruction means for instructing the search direction of the image data to the face detection means in a capture mode, which is a mode of recording the image data; and monitoring mode search direction instruction means for instructing the search direction of the image data to the face detection means in a monitoring mode, which is a mode of displaying the image data. The aspect realizes an operation of changing the search direction at the time of detecting the face portion from the image data between the time of recording the image date and the time of not recording the image data. That is, the importance of face detection differs in the capture mode and the monitoring mode, and the present aspect enables the processing of the image data which reflects the difference of the importance.

Moreover, it is preferable for the imaging apparatus of the the embodiment of the present invention, to further include operation means for supplying a signal for selecting the capture mode when an operation to record the image data is received and another signal for selecting the monitor mode when the operation is not received. Thereby, the operation of selecting the capture mode and the monitoring mode by the operation to record the image data is realized.

Moreover, it is preferable for the imaging apparatus of the the embodiment of the present invention, to further include capture mode direction setting means for setting the search direction of the image data in the capture mode. Thereby, an operation of setting the search direction in the capture mode is realized. That is, it becomes possible to reflect an intension of a user on the search direction in the capture mode.

Moreover, it is preferable for the imaging apparatus of the the embodiment of the present invention that the monitoring mode search direction instruction means instructs the search direction of the image data in the monitoring mode to the face detection means based on the search direction of the face portion detected by the face detection means in past. Thereby, the operation of selecting the search direction in monitoring mode rationally to perform the face detection is realized. That is, high speed face detection is enabled without searching for image data from all directions.

Moreover, it is preferable for the imaging apparatus to further include search direction frequency judgment means for judging a frequency of a search direction in which the face portion has been detected by the face detection means, wherein the monitoring mode search direction instruction means instructs the search direction of the image data in the monitoring mode to the face detection means based on the frequency. Thereby, an operation of performing the face detection in the monitoring mode according to a habit (action pattern) of a user when he or she performs imaging is realized.

Moreover, it is preferable that the monitoring mode search direction instruction means instructs the search direction of the image data in the monitoring mode to the face detection means based on the search direction of the face portion detected last time by the face detection means. Thereby, the operation of performing the face detection in monitoring mode from image data at a high speed efficiently is realized.

Moreover, it is preferable for the imaging apparatus to further include maximum probability judgment means for calculating a probability as the face portion based on the searches in at least two directions by the face detection means to judge a search direction in which the probability becomes a maximum, wherein the monitoring mode search direction instruction means instructs a search direction in which the probability becomes the maximum as the search direction of the image data in the monitoring mode to the face detection means. Thereby, the operation of performing the face detection in the monitoring mode from the image data at a high speed efficiently is realized.

Moreover, it is preferable for the imaging apparatus of the the embodiment of the present invention, to further include inclination detection means for detecting an inclination from a gravitational direction of the imaging apparatus, wherein the monitoring mode search direction instruction means instructs the search direction of the image data in the monitoring mode to the face detection means based on the inclination. Thereby, the operation of performing the face detection in the monitoring mode based on the inclination of the actual imaging apparatus is realized.

Moreover, it is preferable for the imaging apparatus of the the embodiment of the present invention, to further include monitoring mode direction setting means for setting the search direction of the image data in the monitoring mode. Thereby, the operation of allowing a user to set the search direction in the monitoring mode is realized.

Moreover, it is preferable for imaging apparatus of the the embodiment of the present invention that the face detection means performs the search of the image data in at least one direction of a "0 degree" direction, a "+90 degree" direction, a "−90 degree" direction and "180 degree" direction on a supposition that a clockwise direction is a positive direction. Thereby, the operation of performing the face detection only in four kinds of angular directions is realized.

Moreover, it is preferable for the imaging apparatus that the face detection means detects the face portion in a range of from "+45 degrees" to "−45 degrees" of an inclination of the face portion to each of the "0 degree" direction, the "+90 degree" direction, the "−90 degree" direction and the "180 degree" direction of the image data. Thereby, the operation of performing the face detection in consideration of the whole direction of "360 degrees" only by searching the four kinds of angle directions is realized.

Moreover, it is preferable for the imaging apparatus of the the embodiment of the present invention, to further include record control means for recording a detection result including a number of face portions detected by the face detection means as information accompanying an image in association with the image data. Thereby, the operation of making the information accompanying the image of the image data include the number of the detected face portions is realized.

Moreover, according to another embodiment of the present invention, there is provided an imaging apparatus including imaging means for imaging an image to generate image data; face detection means for searching the image data from at least one direction to detect a face portion in the image data; capture mode search direction instruction means for instructing the search direction of the image data to the face detection means in a capture mode, which is a mode of recording the image data; monitoring mode search direction instruction means for instructing the search direction of the image data to the face detection means in a monitoring mode, which is a mode of displaying the image data; and operation means for supplying a signal for selecting the capture mode when the operation means receives an operation to record the image data and a signal for selecting the monitoring mode when the operation means does not receive the operation. The aspect realizes an operation of changing the search direction at the time of detecting the face portion from the image data between the time of recording the image date and the time of not recording the image data.

Moreover, according to further another embodiment of the present invention, there is provided a processing method of executing the following procedure in an imaging apparatus including face detection means for searching image data in at least one direction to detect a face portion in the image data, and operation means for performing an operation to record the image data, or a program for making a computer execute the following procedure, the method including: a capture mode search direction instruction procedure instructing a search direction of the image data to the face detection means in a capture mode, which is a mode of recording the image data; a monitoring mode search direction instruction procedure instructing the search direction of the image data to the face detection means in a monitoring mode, which is a mode of displaying the image data; and a mode shift procedure performing a shift to the capture mode at a time of receiving the operation and continuing the monitoring mode at a time of not receiving the operation; the program making the computer execute the procedures. The aspect realizes an operation of changing the search direction at the time of detecting the face portion from the image data between the time of recording the image date and the time of not recording the image data.

According to the present invention, an excellent effect of detecting a face portion from image data at a high speed efficiently can be obtained.

Further features of the invention, and the advantages offered thereby, are explained in detail hereinafter, in reference to specific embodiments of the invention illustrated in the accompanying drawings.

DETAILED DESCRIPTION

Next, an embodiment of the present invention is described in detail with reference to the attached diagrams.

Figure 1:
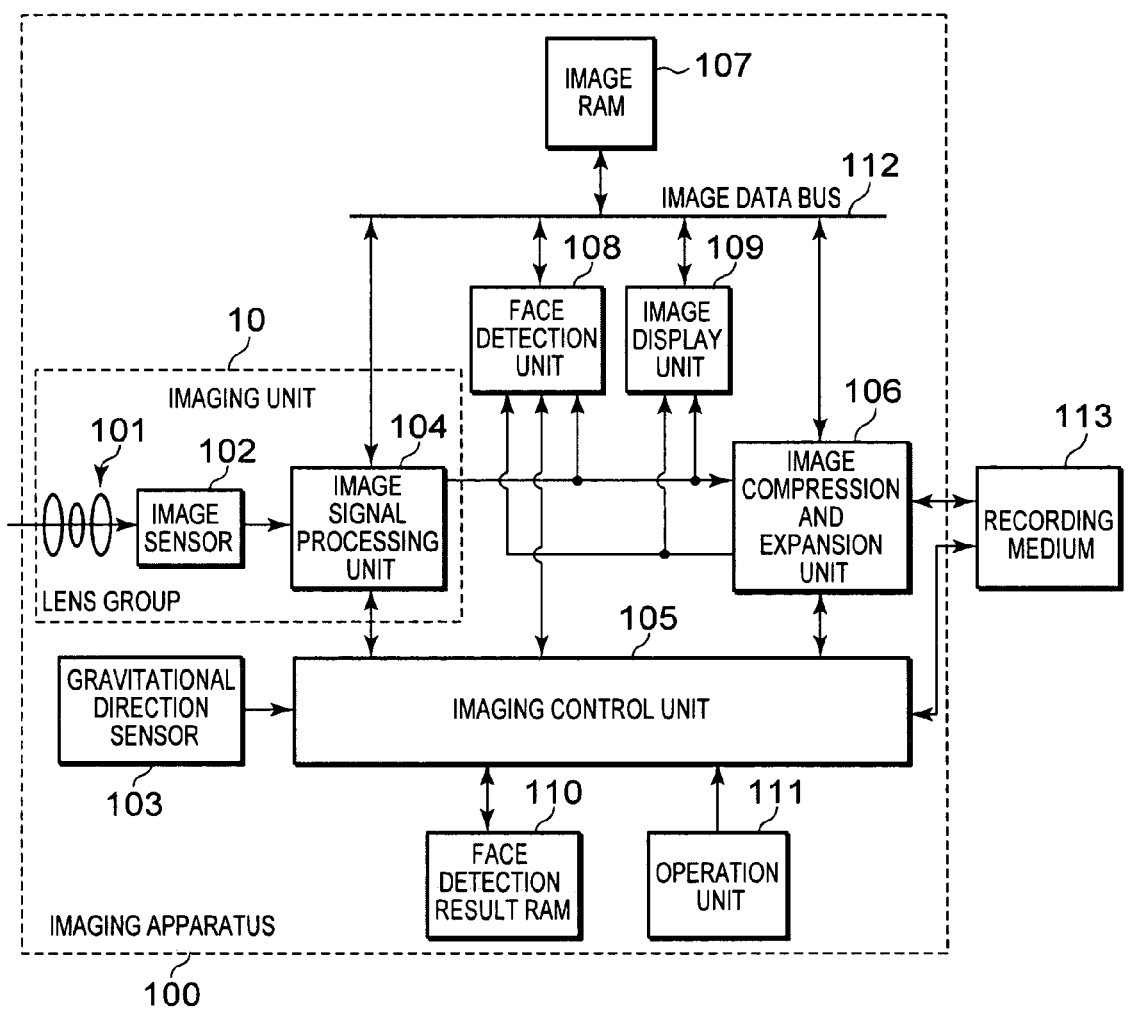
FIG. 1 is a diagram showing an example of the configuration of an imaging apparatus 100 in an embodiment of the present invention.

FIG. 1 is a diagram showing an example of the configuration of an imaging apparatus 100 in the embodiment of the present invention. The imaging apparatus 100 includes an imaging unit 10, a gravitational direction sensor 103, an imaging control unit 105, an image compression and expansion unit 106, an image random access memory (RAM) 107, a face detection unit 108, an image display unit 109, a face detection result RAM 110 and an operation unit 111.

The imaging unit 10 includes a lens group 101, an image sensor 102 and an image signal processing unit 104. The lens group 101 fills the roles of forming an image of a subject to be imaged on an imaging device, and the like. The image sensor 102 is made of an imaging device such as a charge coupled device (CCD), and an image is formed on the image formation surface of the image sensor 102 by the light which has passed through the lens group 101. When the image sensor 102 receives an image capture timing signal supplied from the imaging control unit 105 in response to a shutter operation, the image sensor 102 converts a subject image formed on the image formation surface into an image signal to supply the converted image signal to the image signal processing unit 104.

The gravitational direction sensor 103 is made of, for example, a gyro sensor, and detects the inclination of the imaging apparatus 100 from the gravitational direction. The image signal processing unit 104 executes the processing of an image signal such as the gamma correction, the auto gain control (AGC) and the like of the image signal based on the control of the imaging control unit 105, and also performs the processing of converting the image signal into an image signal as a digital signal. Moreover, the image signal processing unit 104 further performs the white balance control and the like of the image signal based on a control signal from the imaging control unit 105. The imaging control unit 105 is the one in charge of the processing of the whole imaging apparatus 100, and the one performing the recording processing and the reproducing processing of the image signal and the like.

The image compression and expansion unit 106 has a coding function of coding and multiplexing an image signal, supplied from the image signal processing unit 104, and the like to convert the image signal and the like into compressed data. On the other hand, the image compression and expansion unit 106 has a decoding function of decoding an image signal from the compressed data. The image RAM 107 is one holding the image data supplied through an image data bus 112. In the imaging apparatus 100 in FIG. 1, an image signal may be directly transferred between each block, or may be indirectly transferred between each block via the image RAM 107.

The face detection unit 108 is one detecting a face portion in image data. An output of the face detection unit 108 includes the search direction of a face portion of image data, the position of the face portion in the image data, the area of the face portion in the image data, the looking direction of face, the inclination of the face, the number of detected face portions, and the like. If the output of the face detection unit 108 is used, the camera control such as auto-focus, auto-white balance, automatic exposure and the like becomes easy, and consequently the optimum image data can be always supplied to a user.

An output of the face detection unit 108 is supplied to the face detection result RAM 110 and a recording medium 113 through the imaging control unit 105. In addition, the recording medium 113 is made of, for example, a memory card packaging a flash memory in a card style, or the like. Moreover, although the recording medium 113 is illustrated as an external memory in FIG. 1, the recording medium 113 is not limited to the external memory, but a configuration including a hard disk installed in the inside as the recording medium may be adopted.

The image display unit 109 is made of, for example, a liquid crystal display (LCD), and is one displaying the image data supplied from the image signal processing unit 104. Moreover, a configuration of supplying the image data to the image display unit 109 via the image RAM 107 may be adopted.

A plurality of keys such as a zoom adjustment key, a key for exposure adjustment, a shutter key, a moving image photographing key, a display adjustment key the in image display unit 109, and the like is installed in the operation unit 111. The operation unit 111 transmits the operation signal corresponding to each of the plurality of keys to the imaging control unit 105. The imaging control unit 105 discriminates which key has been operated with the operation unit 111, and performs the control processing according to the discrimination result.

In the imaging apparatus 100 of the embodiment of the present invention, when the shutter key in the operation unit 111 is not depressed, the image data captured by the lens group 101 is not recorded on the recording medium 113, but is displayed on the image display unit 109 as it is in real time. Hereinafter, the operation state is supposed to be referred to as a monitoring mode. On the other hand, when the shutter key in the operation unit 111 is depressed, the image data captured by the lens group 101 is recorded on the recording medium 113. Hereinafter, the operation state is supposed to be referred to as a capture mode.

Figure 2:
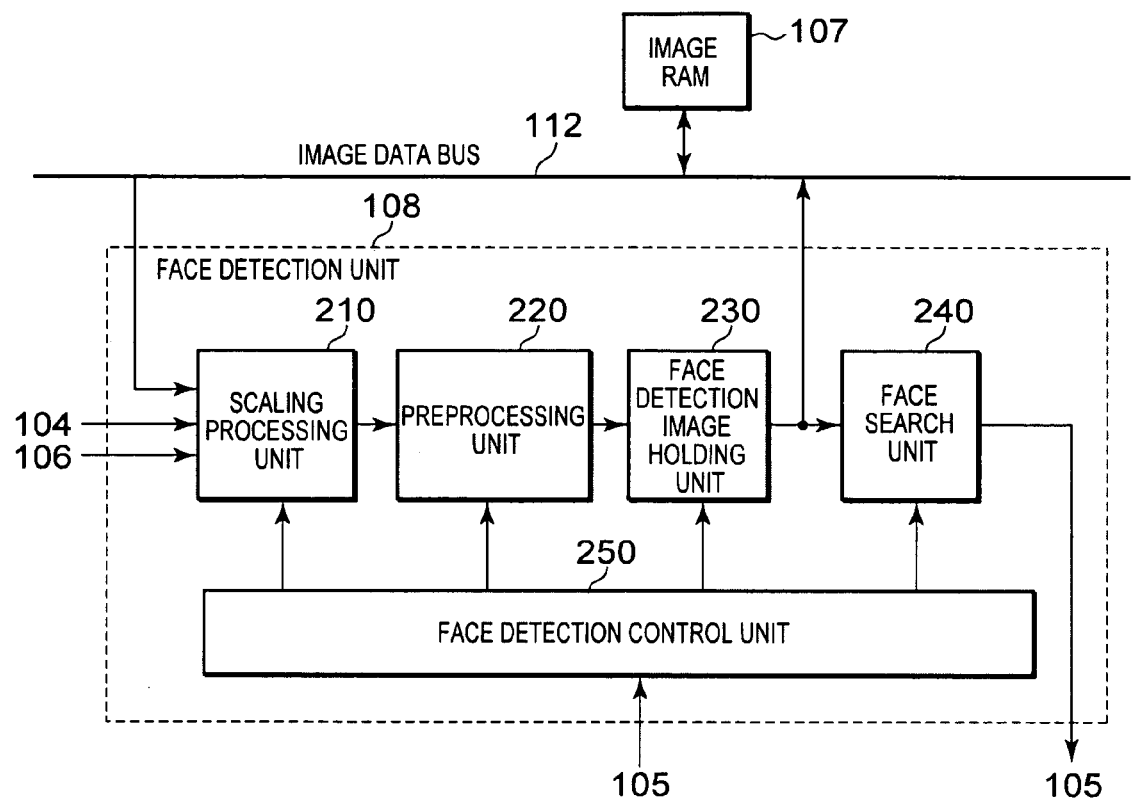
FIG. 2 is a diagram showing an example of the configuration of a face detection unit 108 in the embodiment of the present invention.

FIG. 2 is a diagram showing an example of the configuration of the face detection unit 108 in the embodiment of the present invention. The face detection unit 108 includes a scaling processing unit 210, a preprocessing unit 220, a face detection image holding unit 230, a face search unit 240 and a face detection control unit 250.

The scaling processing unit 210 is one changing the image data supplied from the image RAM 107 into the image data having a predetermined size. That is, when the image data supplied from the image RAM 107 is larger than the predetermined size set beforehand, the scaling processing unit 210 performs the processing of reducing the image data supplied from the image RAM 107. On the other hand, when image data supplied from image RAM 107 is smaller than the predetermined size set beforehand, the scaling processing unit 210 performs the processing of expanding the image data supplied from the image RAM 107. In addition, the scaling processing unit 210 also performs the processing of converting the image data supplied from the image signal processing unit 104 or the image compression and expansion unit 106 into the image data having the predetermined size as well.

The preprocessing unit 220 is one performing predetermined processing to the image data subjected to the reduction processing or the expansion processing by the scaling processing unit 210. As the predetermined processing, for example, luminance conversion processing for normalizing a face portion of image data into a predetermined luminance range, edge enhancement processing for extracting the portions of eyes, a nose, an eyebrow, a mouth and the like in a face portion, and the like are supposed. When the above processing has been completed, the preprocessing of the image data for detecting a face portion from the image data has ended. The preprocessing unit 220 supplies the image data which has received the above processing to the face detection image holding unit 230. The face detection image holding unit 230 holds the image data supplied from the preprocessing unit 220.

The face search unit 240 clips a part of the image data held in the face detection image holding unit 230 to search for a face portion from the image data based on the average face template image held beforehand. On this occasion, when the clockwise direction is supposed to be the positive direction, for example, a face portion is searched in each of the direction in which the image data has been rotated by "0 degree", the direction in which the image data has been rotated by "+90 degrees", the direction in which the image data has been rotated by "−90 degrees" and the direction in which the image data has been rotated by "180 degrees." In addition, because it is supposed that the frequency of imaging a subject by rotating the imaging apparatus 100 by the "180 degrees" is small, the search processing in the "180 degree" direction may be omitted. The output of the face search unit 240 is supplied to the imaging control unit 105.

The face detection control unit 250 controls the scaling processing unit 210, the preprocessing unit 220, the face detection image holding unit 230 and the face search unit 240 in conformity with the information supplied from the imaging control unit 105. Specifically, the face detection control unit 250 supplies, for example, an expansion ratio or a reduction ratio of image data to the scaling processing unit 210. Moreover, the face detection control unit 250 supplies, for example, parameters necessary for the luminance conversion processing, the edge enhancement processing and the like to the preprocessing unit 220. Moreover, the face detection control unit 250 supplies, for example, a memory address to a face detection image memory.

Moreover, the face detection control unit 250 supplies, for example, the search direction of image data and the like to the face search unit 240. In the imaging apparatus 100 of the embodiment of the present invention, the search direction of image data of the face detection unit 108 in the case of the monitoring mode and the one in the case of the capture mode are different from each other. This point is described below.

Figure 3:
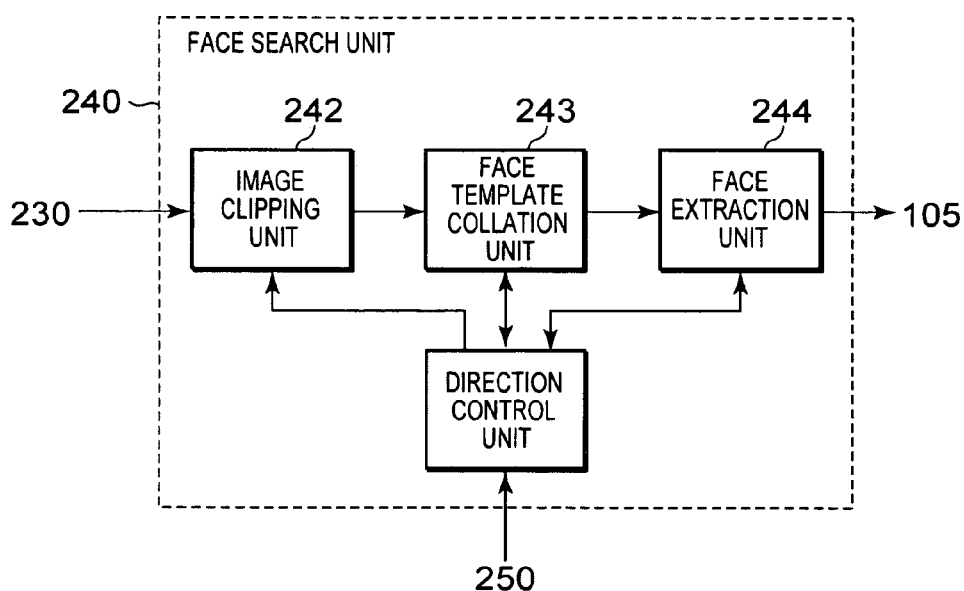
FIG. 3 is a diagram showing an example of the functional diagram of a face search unit 240 in the embodiment of the present invention.

FIG. 3 is a diagram showing an example of the functional configuration of the face search unit 240 in the embodiment of the present invention. The face search unit 240 includes a direction control unit 241, an image clipping unit 242, a face template collation unit 243 and a face extraction unit 244.

The direction control unit 241 is one controlling the processing in the image clipping unit 242, the face template collation unit 243 and the face extraction unit 244 based on the search direction of the image data instructed by the face detection control unit 250. The image clipping unit 242 supplies a clipped image produced by clipping a part of the image data held by the face detection image holding unit 230 to the face template collation unit 243. Specifically, the image clipping unit 242 clips a part of image data held by the face detection image holding unit 230 in response to an instruction from the direction control unit 241. When the direction control unit 241 has completed a series of processing of a clipped image, the direction control unit 241 instructs the image clipping unit 242 to supply a clipped image the pixels of which are shifted from those of the last clipped image by a predetermined pixels (e.g. two pixels) to the face plate template collation unit 243. The processing described above is repeatedly performed.

The face template collation unit 243 is one collating the clipped image supplied from the image clipping unit 242 with the average face template image data which the face template collation unit 243 itself holds to search for a face portion. When the clipped image is fitted to the average face template image as the search result, it is judged that a face portion exists in the clipped image. The search here is performed in conformity with the instruction from the face detection control unit 250. The face template collation unit 243 transmits the search direction judged that a face portion exists therein to the face extraction unit 244. In addition, although the inclination of the imaging apparatus 100 does not always become the 0 degree, the +90 degrees, the −90 degrees and the 180 degrees, the search of the face portion can be performed as long as the inclination of the face portion is in a range of 45 degrees from each angle of the 0 degree, the +90 degrees, the −90 degrees and the 180 degrees, as will be described later.

When it is judged that a face portion exists in the image data by the face template collation unit 243, the face extraction unit 244 extracts the concrete position and the like of the face portion in image data. The output of the face extraction unit 244 includes the search direction of the face portion in the image data in the face template collation unit 243, the position of the face portion in the image data of the face portion in image data, the number of the face portions, and the like. The output of face extraction unit 244 is supplied to the imaging control unit 105.

Figure 4:
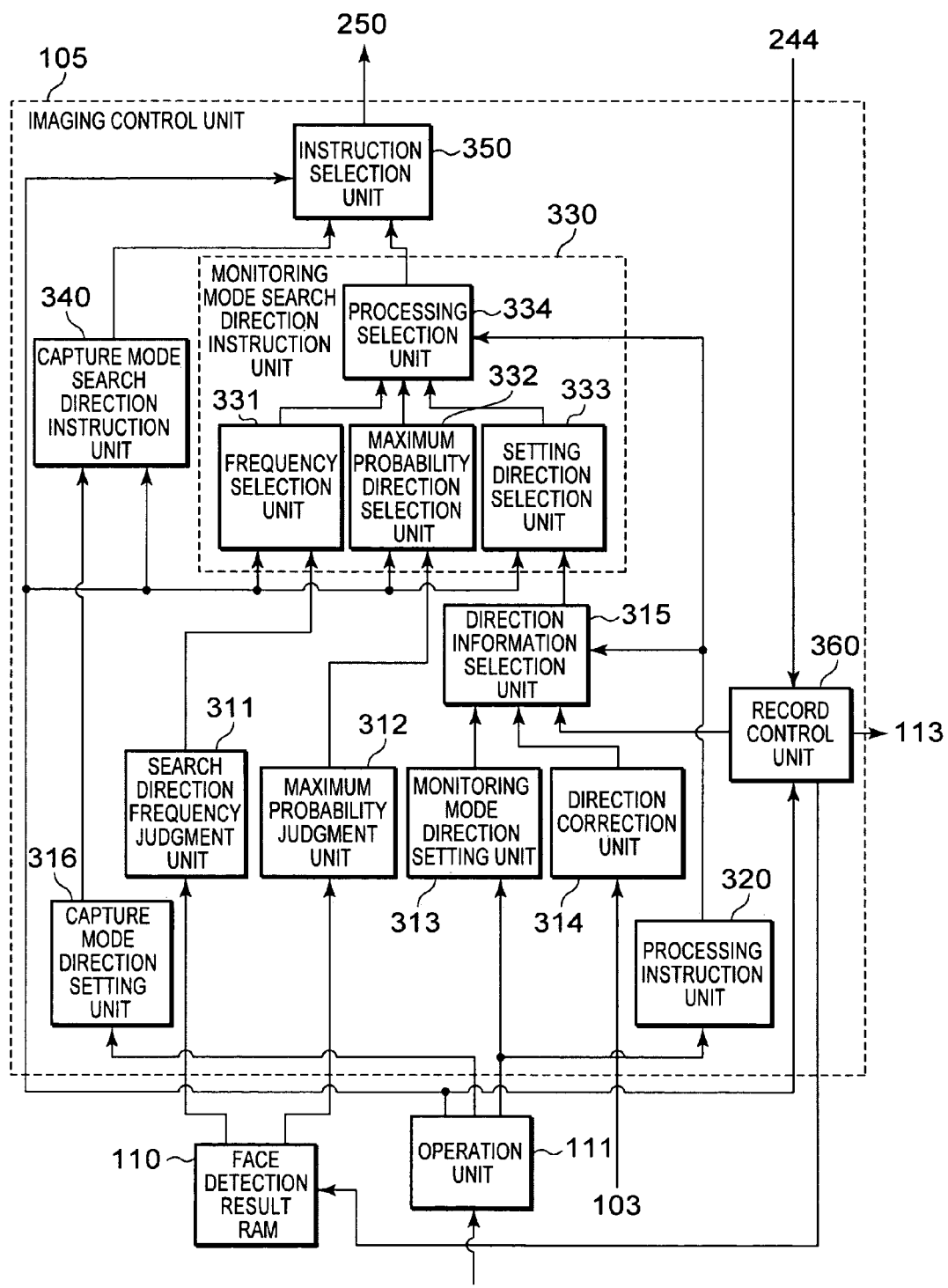
FIG. 4 is a diagram showing an example of the functional configuration of image control unit 105 in the present embodiment.

FIG. 4 is a diagram showing an example of the functional configuration of the imaging control unit 105 in the embodiment of the present invention. The imaging control unit 105 includes a search direction frequency judgment unit 311, a maximum probability judgment unit 312, a monitoring mode direction setting unit 313, a direction correction unit 314, a direction information selection unit 315, a capture mode direction setting unit 316, a processing instruction unit 320, a monitoring mode search direction instruction unit 330, a capture mode search direction instruction unit 340, an instruction selection unit 350 and a record control unit 360.

The search direction frequency judgment unit 311 is one monitoring a detection result of a face portion in the image data held in the face detection result RAM 110 and supplied from the face detection unit 108 to judge the search direction having the highest frequency of detecting the face portion. This judgment result is supplied to a frequency selection unit 331. The maximum probability judgment unit 312 judges which search direction has the highest probability of the existence of a face portion among, for example, the search directions in which the first detection of the face plate has been performed after the power activation of the image apparatus 100 in the embodiment of the present invention. The result of the judgment by the search direction frequency judgment unit 311 is supplied to a maximum probability direction selection unit 332.

The monitoring mode direction setting unit 313 is one allowing a user to set the direction of searching for image data in the monitoring mode through the operation unit 111. The direction correction unit 314 is one judging which direction to the image data the inclination of the imaging apparatus 100 supplied from the gravitational direction sensor 103 corresponds to between the direction in which the imaging apparatus 100 is rotated by "0 degree", the direction in which the imaging apparatus 100 is rotated by "+90 degrees", the direction in which the imaging apparatus 100 is rotated by "−90 degrees" and the direction in which the imaging apparatus 100 is rotated by "180 degrees." As will be described later, because the search of the face portion can be performed as long as the inclination is within the range of ±45 degrees from each angle of the 0 degree, the +90 degrees, the −90 degrees and the 180 degrees, for example, when the inclination of the imaging apparatus 100 is 20 degrees to the gravitational direction, the inclination is judged to correspond to the direction in which the imaging apparatus 100 is rotated by 0 degree to the image data. Moreover, when the inclination of the imaging apparatus 100 is +80 degrees to the gravitational direction, the inclination is judged to correspond to the direction in which the imaging apparatus 100 is rotated by +90 degrees.

The direction information selection unit 315 is one supplying any one search directions to a setting direction selection unit 333 among the search directions supplied from the monitoring mode direction setting unit 313, the direction correction unit 314 and the record control unit 360. The selection is performed based on an instruction from the processing instruction unit 320.

The capture mode direction setting unit 316 is one allowing the user to set a direction in which image data is searched for in the capture mode with the operation unit 111. Because the capture mode is the mode in which the image data being imaged is recorded as still image data, the detection rate of a face portion from the image data is required to be high. On the other hand, if the image data is searched for from each angle of the "0 degree", the "+90 degrees", the "−90 degrees" and the "180 degrees", such processing takes a lot of time. Accordingly, by limiting the search directions with the capture mode direction setting unit 316, the improvement of the speed of processing can be attained.

It is set with the operation unit 111 which function of the search direction frequency judgment unit 311, the maximum probability judgment unit 312, the monitoring mode direction setting unit 313, the direction correction unit 314, the direction information selection unit 315 and the capture mode direction setting unit 316, all described above, is used. When the function is set with the operation unit 111, the information of the set function is supplied to the processing instruction unit 320. The processing instruction unit 320 supplies the instruction instructing the selection of the search direction supplied from the set function to the direction information selection unit 315 and a processing selection unit 334.

The monitoring mode search direction instruction unit 330 is one performing the instruction of the search direction of image data in the monitoring mode to the face search unit 240, and includes the frequency selection unit 331, the maximum probability direction selection unit 332, the setting direction selection unit 333 and the processing selection unit 334. The frequency selection unit 331 is one selecting the search direction of image data in the face search unit 240 based on the search direction in which the frequency of detecting a face portion is the highest and which search direction has been supplied from the search direction frequency judgment unit 311 to supply the selected search direction to the processing selection unit 334. By determining the next search direction based on the frequencies of the search directions in which face portions was detected in the past, the search direction in consideration of the habit (the operation pattern) of a user can be selected.

Moreover, the maximum probability direction selection unit 332 is one selecting the search direction based on the search direction in which the probability of the face portion is the highest and which has been supplied from the maximum probability judgment unit 312 to supply the selected search direction to the processing selection unit 334. By selecting the search direction based on the search direction in which the probability of the face portion is the highest, the useless search direction can be omitted to determine the search direction at the next time, and high speed face detection processing can be attained.

Moreover, the setting direction selection unit 333 is one selecting the search direction of image data based on the search direction supplied from the direction information selection unit 315 to supply the selected search direction to the processing selection unit 334. The processing selection unit 334 is one supplying any one of the search directions supplied from the frequency selection unit 331, the maximum probability direction selection unit 332 and the setting direction selection unit 333 based on the instruction from the processing instruction unit 320 to the instruction selection unit 350.

In the monitoring mode, high speed face detection is enabled by omitting the useless search direction of image data in the face detection using the functions described above. And by the realization of the high speed face detection, the result obtained by the face detection can be fed back to the control of the auto-focus, the auto-white balance, the automatic exposure and the like at a high speed.

The capture mode search direction instruction unit 340 is one performing the instruction of the search direction of image data in the capture mode. The search direction of image data in the capture mode is supplied from the capture mode direction setting unit 316 as mentioned above. In addition, on the supposition that the clockwise direction to image data is the positive direction, all of the search directions of the direction in which the image data is rotated by "0 degree", by "+90 degrees", by "−90 degrees" and by "180 degrees", or the search directions excepting the direction in which the image data is rotated by the "180 degrees" from the all directions are supposed as the search directions of image data in the capture mode. The reason is that because image data is recorded in the capture mode, it is desirable to make the face detection rate high.

When a requirement signal requiring the record of image data, for example a signal corresponding to the shutter key, is supplied from the operation unit 111, the instruction selection unit 350 selects an instruction in the capture mode search direction instruction unit 340 to supply the selected instruction to the face detection control unit 250. On the other hand, when the signal corresponding to the shutter key is not supplied, the instruction selection unit 350 supplies the instruction in the monitoring mode search direction instruction unit 330 to the face detection control unit 250. That is, the imaging apparatus 100 takes the capture mode in the sate in which the requirement signal requiring the record of the image data is supplied from the operation unit 111 to the instruction selection unit 350, and takes the monitoring mode in the state in which the requirement signal is not supplied to the instruction selection unit 350.

The record control unit 360 supplies the search direction included in an output from the face search unit 240 to the direction information selection unit 315 and the face detection result RAM 110. Moreover, when a requirement signal requiring the record of image data is supplied from the operation unit 111, the record control unit 360 supplies the output from the face search unit 240 corresponding to the requirement signal to the recording medium 113 as the information accompanying an image like, for example, metadata. The supplied information accompanying the image is recorded in associated with the image data. Although the number of face portions included in the image data is also included in the output from the face search unit 240, it becomes possible to retrieve the image data including the face portions consistent with the number of the face portions based on the number by recording the number of the face portions as the information accompanying the image in association with the image data.

Figure 5A:
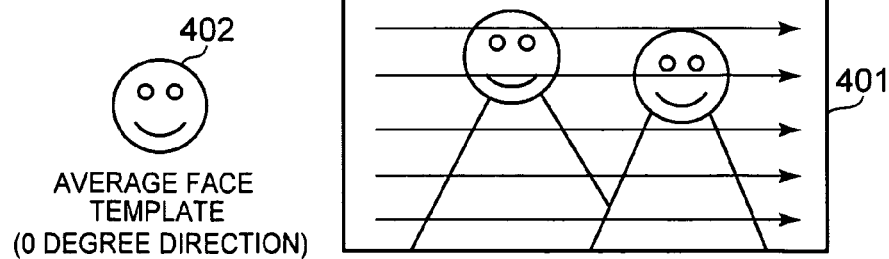
FIGS. 5A, 5B, 5C and 5D are diagrams showing directions of searching face portions by collating image data with average face template.

FIGS. 5A-5D are diagrams showing the directions in which image data and an average face template are collated with each other and a face portion is searched for. FIG. 5A is a diagram showing an average face template 402 in the "0 degree" direction to image data 401. In this case, the image data 401 and the average face template 402 are collated with each other in the arrow directions of FIG. 5A as search directions based on the average face template 402 to the image data 401. Because the face directions of the face portions in the image data 401 are consistent with the face direction of the average face template 402, the face portions are detected.

Figure 5B:
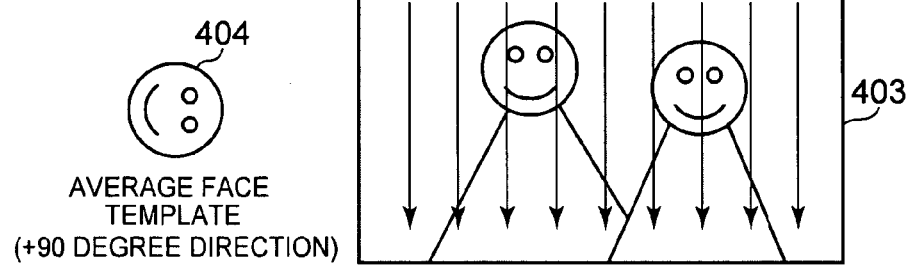

FIG. 5B is a diagram showing an average face template 404 in the "+90 degree" direction to image data 403 on the supposition that the clockwise direction is set as the positive direction. In this case, the image data 403 and the average face template 404 are collated with each other in the arrow directions of FIG. 5B as search directions based on the average face template 404 to the image data 403. Because each of the face directions of the face portions in the image data 403 is shifted from the face direction of the average face template 404 by the "+90 degrees" on the supposition that the clockwise direction is set as the positive direction, the face portions are not detected.

Figure 5C:
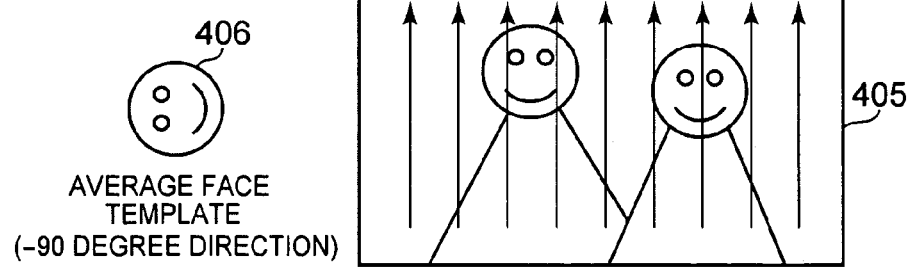

FIG. 5C is a diagram showing an average face template 406 in the "−90 degree" direction to image data 405 on the supposition that the clockwise direction is set as the positive direction. In this case, the image data 405 and the average face template 406 are collated with each other in the arrow directions of FIG. 5C as search directions based on the average face template 406 to the image data 405. Because each of the face directions of the face portions in the image data 405 is shifted from the face direction of the average face template 406 by the "−90 degrees" on the supposition that the clockwise direction is set as the positive direction, the face portions are not detected.

Figure 5D:
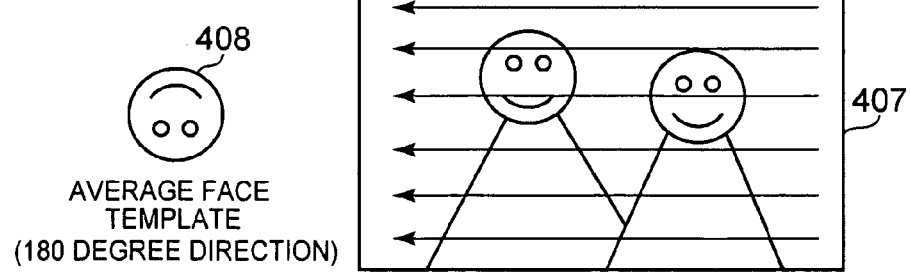

FIG. 5D is a diagram showing an average face template 408 in the "180 degree" direction to image data 407. In this case, the image data 407 and the average face template 408 are collated with each other in the arrow directions of FIG. 5D as search directions based on the average face template 408 to the image data 407. Because each of the face directions of the face portions in the image data 407 is shifted from the face direction of the average face template 408 by the "180 degrees", the face portions are not detected.

Figure 6A:
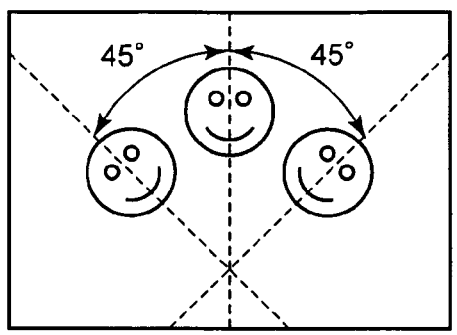
FIGS. 6A, 6B, 6C and 6D are diagrams showing face detection of "360 degrees" by the combination of four kinds of search directions and detection operations of inclined faces.

FIGS. 6A-6D are diagrams showing face detections in "360 degree" directions by a combination of four kinds of search directions and the detection operations of inclined faces. FIG. 6A is a diagram showing the direction rotated by the "0 degree" to image data as a search direction. There are two face portions inclined by "+45 degrees" or "−45 degrees" in comparison with the face portion located at the center on the supposition that the clockwise direction is set as the positive direction. The face portions having the inclinations within a range of from "+45 degrees" to "−45 degrees" in comparison with the face portion located at the center can be detected by a search into the direction rotated by the "0 degree" to the image data.

Figure 6C:
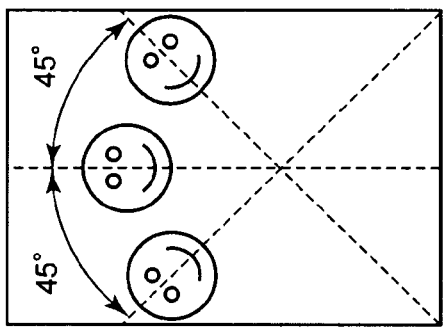
Figure 6B:
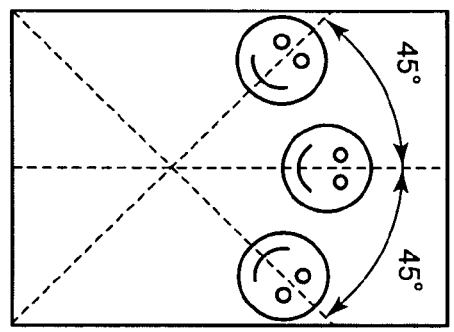
Figure 6D:
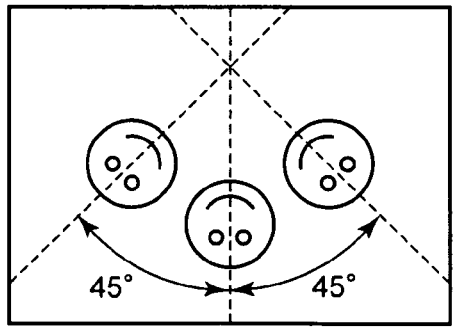

FIG. 6B is a diagram showing the direction rotated by the "+90 degrees" to the image data as a search direction on the supposition that the clockwise direction is the positive direction. FIG. 6C is a diagram showing the direction rotated by the "−90 degrees" to the image data as a search direction on the supposition that the clockwise direction is the positive direction. FIG. 6D is a diagram showing the direction rotated by the "180 degrees" to the image data as a search direction. Also in these cases, similarly to the case of FIG. 6A, the face portions having the inclination within the range of from the "+45 degrees" to the "−45 degrees" can be detected by the search in each direction. Consequently, by the searches in the directions rotated by the "0 degree", the "+90 degrees", the "−90 degrees" and the "180 degrees" to the image data on the supposition that the clock wise direction is set as the positive direction, "360 degree" directions searches are enabled, and all of the face portions can be detected no matter how the positions of the face portion are.

The detection direction of a face portion when the face portion inclines in this manner is described below. First, the inclination of a face image is corrected by obtaining the inclination of image data of a face. Thereby, the "360 degree" direction searches is enabled by performing the searches in the directions rotated by the "0 degree", the "+90 degrees", the "−90 degrees" and the "180 degree" to the image data on the supposition that the clockwise direction is set as the positive direction. Specifically, the image data of the face is rotated by a predetermined angle. The center line of the face in the face portion of the rotated rotation image data is determined, and the degree of the probability of the center line at that time is calculated. The processing similar to the processing described above is performed at the other predetermined angles to calculate the degree of the probability of each of the center lines. The degree of the probability of each of the center lines is monitored to detect the angle at which the degree of the probability of the center line is the highest. The angle is determined as the inclination of the face portion. When the inclination of the face portion is known, a search in any one direction between the directions rotated by the "0 degree", the "+90 degrees", the "−90 degrees" and the "180 degrees" to the image data on the supposition that the clockwise direction is set as the positive direction by rotating the image data in consideration of the angle of the inclination.

Next, the operation of the embodiment of the present invention is described with reference to the drawings.

Figure 7:
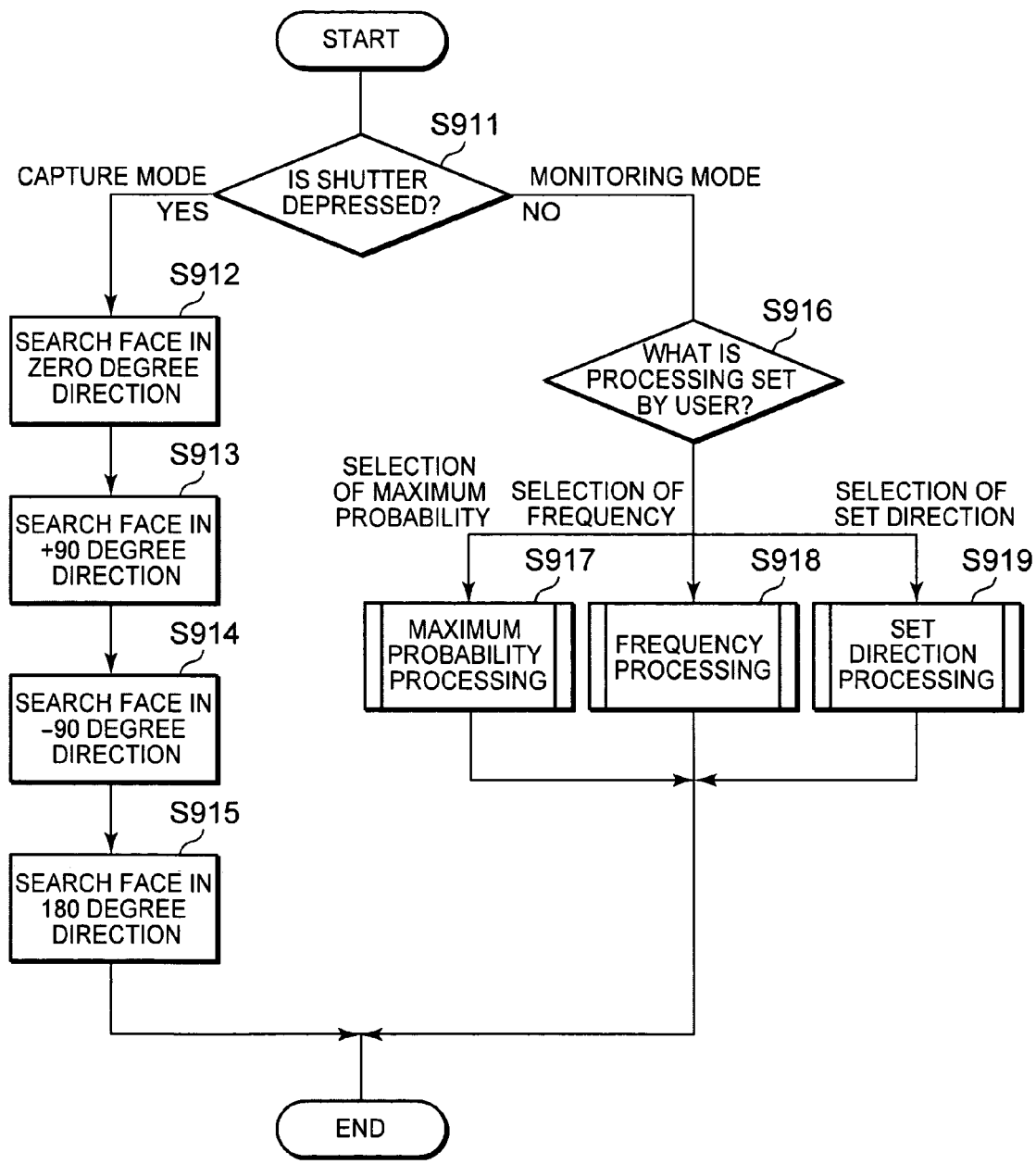
FIG. 7 is a diagram showing the flow at the time of searching image data in the imaging apparatus 100 in the embodiment of the present invention.

FIG. 7 is a diagram showing the flow at the time of searching image data in the imaging apparatus 100 of the embodiment of the present invention. When the shutter is depressed for recording the image data in an image in the imaging apparatus 100, the imaging apparatus 100 enters the capture mode. When the shutter is not depressed, the imaging apparatus takes the monitoring mode (Step S911). In the capture mode, a face portion is searched for in the imaged image data by the face detection unit 108. When the face portion is searched for in the imaged image data, the previously held average face template image data and the image data which has received the predetermined processing described with reference to FIG. 2 by the scaling processing unit 210 and the preprocessing unit 220 after imaging (hereinafter, the image data is referred to as "imaged and processed image data") are collated with each other.

At the time of the collation, first, the average face template image data and the imaged and processed image data are collated in the direction of the "0 degree" rotation to the image data to search for a face portion (Step S912). Next, the average face template image data and the imaged and processed image data are collated with each other in the "+90 degree" rotation direction to the image data on the supposition that the clockwise direction is set as the positive direction to search for the face portion (Step S913). Next, the average face template image data and the imaged and processed image data are collated with each other in the "−90 degree" rotation direction to the image data on the supposition that the clockwise direction is set as the positive direction to search for the face portion (Step S914). Next, the average face template image data and the imaged and processed image data are collated with each other in the "180 degree" rotation direction to the image data to search for the face portion (Step S915). The results of the processing from Step S912 to Step S915 are reflected on the processing of improving the image quality of the image data. In addition, because the processing at Step S915 between the steps from Step S912 to Step S915 is the processing in "180 degree" direction and the frequency where a face portion is detected in the "180 degree" direction is low, the processing at Step S915 is omissible. Thereby, a high speed face detection is enabled.

On the other hand, in monitoring mode, the procedure changes according to the processing set by a user beforehand with regard to the search of a face portion (Step S916). First processing of the search for the face portion in image data is maximum probability processing of searching for the face portion in the directions of the "0 degree" rotation, the "+90 degree" rotation, the "−90 degree" rotation and the "180 degree" rotation to the image data on the supposition that the clockwise direction is set as the positive direction to set the search direction having the highest probability of the existence of the face portion as the next search direction of the face portion (Step S917). Second processing of the search for the face portion in the image data is frequency processing of monitoring the search direction of the image data included in the output of the face detection unit 108 for a predetermined time to set the search direction having the largest frequency as the next search direction of the face portion (Step S918). Third processing of the search for the face portion from the image data is set direction processing of setting the search direction which the user has set beforehand as the search direction (Step S919). The result of any one of the processing from Step S917 to Step S919 is reflected on the control of the auto-focus, the auto-white balance, the automatic exposure and the like.

In addition, in set direction processing, it is also possible to use not only the search direction which the user set in advance but also the search direction determined by the gravitational direction sensor 103 and the direction correction unit 314 and the search direction in which a face portion has been detected in the previous frame.

Figure 8:
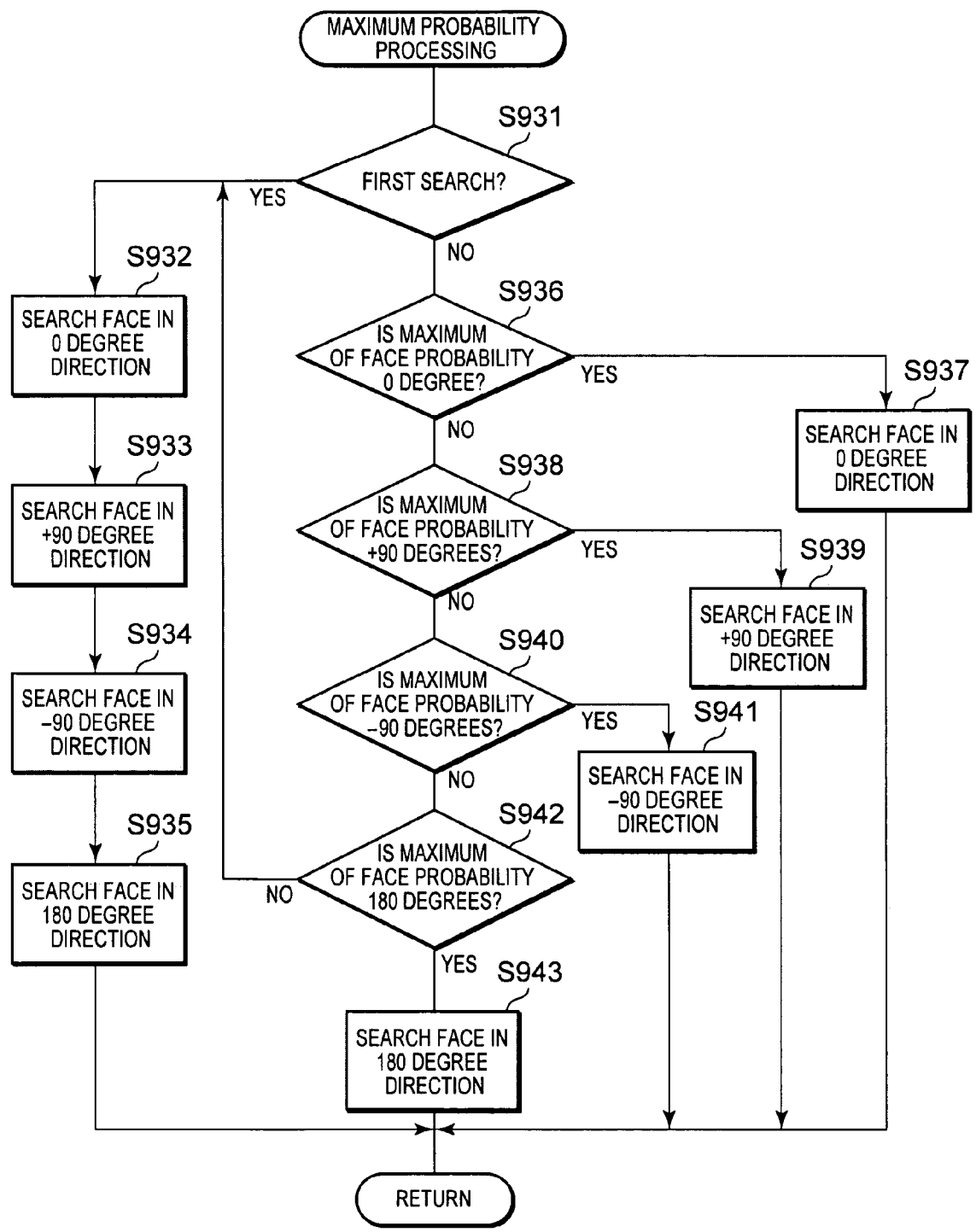
FIG. 8 is a diagram showing the flow of maximum probability processing in the embodiment of the present invention.

FIG. 8 is a diagram showing the flow of the maximum probability processing of the embodiment of the present invention. In the maximum probability processing, first it is necessary to search a face portion in the directions of the "0 degree" rotation, the "+90 degree" rotation, the "−90 degree" rotation and the "180 degree" rotation to the image data on the supposition that the clockwise direction is set as the positive direction. This search is referred to as the first search. First, it is judged whether the first search has been performed or not (Step S931).

When it is judged that the first search has not been preformed yet, first the average face template image data and the imaged and processed image data are collated with each other in the direction of the "0 degree" rotation to the image data to search for the face portion (Step S932). Next, the average face template image data and the imaged and processed image data are collated with each other in the direction of the "+90 degree" rotation to the image data on the supposition that the clockwise direction is set as the positive direction to search for the face portion (Step S933). Next, the average face template image data and the imaged and processed image data are collated with each other in the direction of the "−90 degree" rotation to the image data on the supposition that the clockwise direction is set as the positive direction to search for the face portion (Step S934). Next, the average face template image data and the imaged and processed image data are collated with each other in the direction of the "180 degree" rotation to search for the face portion (Step S935). In addition, because the processing at Step S935 between the steps from Step S932 to Step S935 is the processing of the "180 degree" direction and the frequency of detecting a face portion in the "180 degree" direction is low, the processing at Step S935 is omissible. Thereby, a high speed face detection is enabled.

When it is judged that the first search had already been performed, it is judged whether the search direction having the highest probability of existence of a face portion in the first search is the direction of the "0 degree" rotation to the image data or not based on the result of the first search (Step S936). When it is judged that the search direction having the highest probability of the existence of the face portion is the direction of the "0 degree" rotation to the image data in the first search, the search for the face portion is performed only in the direction of the "0 degree" rotation to the image data (Step S937). The processing in the other search directions is not performed.

When it is judged that the search direction having the highest probability of the existence of the face portion is not the direction of the "0 degree" rotation to the image data in the first search, it is next judged whether the search direction having the highest probability of the existence of the face portion is the direction of the "+90 degree" rotation to the image data or not on the supposition that the clockwise direction is set as the positive direction based on the result of the first search (Step S938). When it is judged that the search direction having the highest probability of the existence of the face portion is the direction of the "+90 degree" rotation to the image data on the supposition that the clockwise direction is the positive direction in the first search, the search for the face portion is performed only in the direction of the "+90 degree" rotation to the image data on the supposition that the clockwise direction is set as the positive direction (Step S939). The processing in the other search directions is not performed.

When it is judged that the search direction having the highest probability of the existence of the face portion is not the direction of the "+90 degree" rotation to the image data in the first search on the supposition that the clockwise direction is the positive direction, it is next judged whether the search direction having the highest probability of the existence of the face portion is the direction of the "−90 degree" rotation to the image data or not on the supposition that the clockwise direction is set as the positive direction based on the result of the first search (Step S940). When it is judged that the search direction having the highest probability of the existence of the face portion is the direction of the "−90 degree" rotation to the image data on the supposition that the clockwise direction is the positive direction in the first search, the search for the face portion is performed only in the direction of the "−90 degree" rotation to the image data on the supposition that the clockwise direction is the positive direction (Step S941). The processing in the other search directions is not performed.

When it is judged that the search direction having the highest probability of the existence of the face portion is not the direction of the "−90 degree" rotation to the image data in the first search on the supposition that the clockwise direction is the positive direction, it is next judged whether the search direction having the highest probability of the existence of the face portion is the direction of the "180 degree" rotation to the image data or not based on the result of the first search (Step S942). When it is judged that the search direction having the highest probability of the existence of the face portion is the direction of the "180 degree" rotation to the image data in the first search, the search for the face portion is performed only in the direction of the "180 degree" rotation to the image data (Step S943). The processing in the other search directions is not performed.

When it is judged that the search direction having the highest probability of the existence of the face portion is not the direction of the "180 degree" rotation to the image data in the first search, it is resulted that no face portions have been detected in any of the directions of the "0 degree" rotation, the "+90 degree" rotation, the "−90 degree" rotation and the "180 degree" rotation to the image data on the supposition that the clockwise direction is set as the positive direction. Accordingly the first search should be performed again at the next time. That is, the processing from Step S932 to Step S935 is performed.

In addition, when a change of the inclination of the imaging apparatus 100 is detected by the gravitational direction sensor 103, the first search may be performed again even after the judgment of the execution of the first search at Step S931 to perform the processing of the judgment of the search direction having the highest probability of the existence of the face portion.

Figure 9:
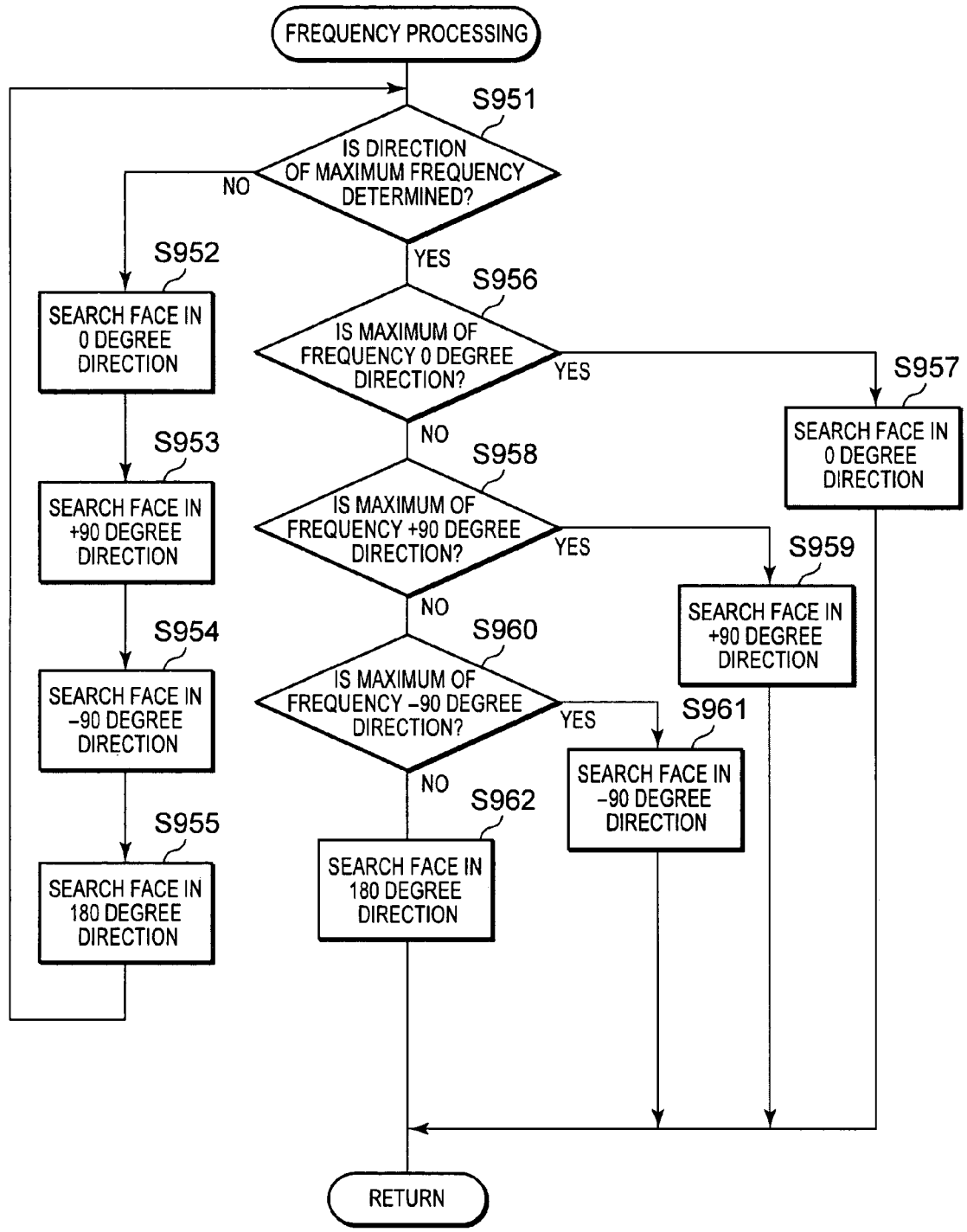
FIG. 9 is a diagram showing the flow of frequency processing in the embodiment of the present invention.

FIG. 9 is a diagram showing the flow of the frequency processing of the embodiment of the present invention. In the frequency processing, it is first judged whether the search direction having the maximum frequency has been determined or not (Step S951). When the search direction having the maximum frequency has not been determined yet, similarly to the search of the face portion in case of the capture mode described with reference to FIG. 7, the search of the face portion is performed in each of the directions of the "0 degree" rotation, the "+90 degree" rotation, the "−90 degree" rotation and the "180 degree" rotation to the image data on the supposition that the clockwise direction is set as the positive direction (Steps S952-S955). The processing from Step S952 to Step S955 is repeated until the search direction having the maximum frequency is determined.

When the search direction having the maximum frequency is determined, it is next judged whether the search direction having the maximum frequency is the rotated direction or not (Step S956). When it is judged that the search direction having the maximum frequency is the direction rotated by the "0 degree" to the image data, the search of the face portion is preformed only in the direction rotated by the "0 degree" to the image data (Step S957). The processing in the other search directions is not performed.

When it is judged that the search direction having the maximum frequency is not the direction of the "0 degree" rotation to the image data, it is next judged whether the search direction having the maximum frequency is the direction of the "+90 degree" rotation to the image data or not on the supposition that the clockwise direction is set as the positive direction (Step S958). When it is judged that the search direction having the maximum frequency is the direction of the "+90 degree" rotation to the image data on the supposition that the clockwise direction is set as the positive direction, the search for the face portion is performed only in the direction of the "+90 degree" rotation to the image data on the supposition that the clockwise direction is set as the positive direction (Step S959). The processing of the other search directions is not performed.

When it is judged that the search direction having the maximum frequency is not the direction of the "+90 degree" rotation to the image data on the supposition that the clockwise direction is set as the positive direction, it is next judged whether the search direction having the maximum frequency is the direction of the "−90 degree" rotation to the image data or not on the supposition that the clockwise direction is set as the positive direction (Step S960). When it is judged that the search direction having the maximum frequency is the direction of the "−90 degree" rotation to the image data on the supposition that the clockwise direction is set as the positive direction, the search for the face portion is performed only in the direction of the "−90 degree" rotation to the image data on the supposition that the clockwise direction is set as the positive direction (Step S961). The processing of the other search directions is not performed.

When it is judged that the search direction having the maximum frequency is not the direction of the "−90 degree" rotation to the image data on the supposition that the clockwise direction is set as the positive direction, the search direction having the maximum frequency is the direction of the "180 degree" rotation to the image data. Consequently, the search for the face portion is performed in the direction of the "180 degree" rotation to the image data (Step S962).

Figure 10:
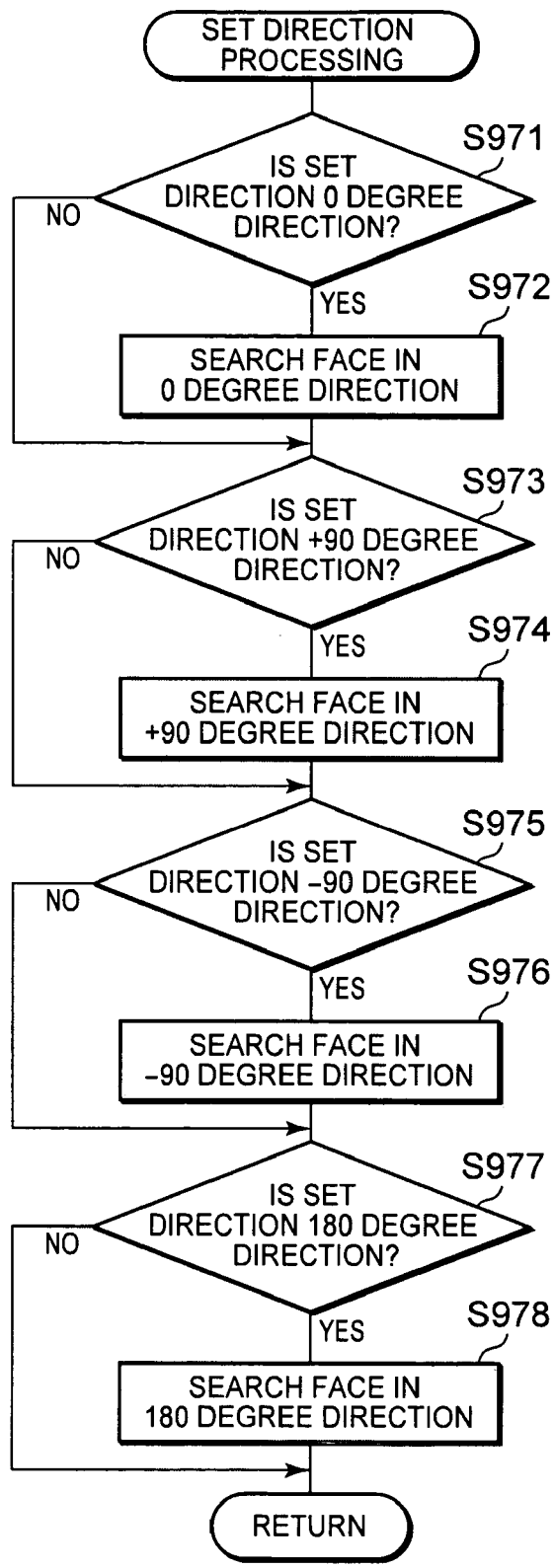
FIG. 10 is a diagram showing the flow of set direction processing in the embodiment of the present invention.

FIG. 10 is a diagram showing the flow of set direction processing of the embodiment of the present invention. It is first judged whether the search direction which the user has set beforehand is the direction of the "0 degree" rotation to the image data or not (Step S971). When it is judged that the search direction which the user has set beforehand is the direction of the "0 degree" rotation to the image data, the search for a face portion is performed in the direction of the "0 degree" rotation to the image data (Step S972).

When it is judged that the search direction which the user has set beforehand is not the direction of the "0 degree" rotation to the image data, or when the processing of Step S972 is completed, it is next judged whether the search direction which the user has set beforehand is the direction of the "+90 degree" rotation to the image data on the supposition that the clockwise direction is set as the positive direction or not (Step S973). When it is judged that the search direction which the user has set beforehand is the direction of the "+90 degree" rotation to the image data on the supposition that the clockwise direction is set as the positive direction, the search for the face portion is performed in the direction of the "+90 degree" rotation to the image data on the supposition that the clockwise direction is set as the positive direction (Step S974).

When it is judged that the search direction which the user has set beforehand is not the direction of the "+90 degree" rotation to the image data on the supposition that the clockwise direction is set as the positive direction, or when the processing of Step S974 is completed, it is next judged whether the search direction which the user has set beforehand is the direction of the "−90 degree" rotation to the image data on the supposition that the clockwise direction is set as the positive direction or not (Step S975). When it is judged that the search direction which the user has set beforehand is the direction of the "−90 degree" rotation to the image data on the supposition that the clockwise direction is set as the positive direction, the search for the face portion is performed in the direction of the "−90 degree" rotation to the image data on the supposition that the clockwise direction is set as the positive direction (Step S976).

When it is judged that the search direction which the user has set beforehand is not the direction of the "−90 degree" rotation to the image data on the supposition that the clockwise direction is set as the positive direction, or when the processing of Step S976 is completed, it is next judged whether the search direction which the user has set beforehand is the direction of the "180 degree" rotation to the image data or not (Step S977). When it is judged that the search direction which the user has set beforehand is the direction of the "180 degree" rotation to the image data, the search for the face portion is performed in the direction of the "180 degree" rotation to the image data (Step S976).

In addition, as described above, in the set direction processing, it is possible to use not only the search direction that the user has set beforehand but also the search direction determined by the gravitational direction sensor 103 and the direction correction unit 314 and the search direction in which the face portion has been detected in the preceding frame. Consequently, by reading the phrases "the search direction which the user has set beforehand" in the above description for "the search direction determined by the gravitational direction sensor 103 and the direction correction unit 314" or "the search direction in which the face portion has been detected in the preceding frame", also as to each of the search direction determined by the gravitational direction sensor 103 and the direction correction unit 314 and the search direction in which the face portion has been detected in the preceding frame, the search of the face portion is performed by similar processing.

As described above, according to the embodiment of the present invention, in the monitoring mode, high speed face detection processing can be realized, and the face detection processing can be fed back at a high speed to the control of the auto-focus, the auto-white balance, the automatic exposure and the like based on the result of the face detection processing. On the other hand, in the capture mode, by performing the face detection maintaining a high detection rate, it is realized to surely perform the processing of improving the image quality of recorded image data.

In addition, the embodiment of the present invention is shown as an example for implementing the present invention, and has corresponding relations to the invention specifying matters in the claims as shown in the following. However, the present invention is not limited to the embodiment, and various modifications can be performed in the range without departing from the subject matter of the present invention.

That is, in claim 1, the face detection means corresponds to, for example, the face detection unit 108. Moreover, the capture mode search direction instruction means corresponds to, for example, the capture mode search direction instruction unit 340. Moreover, the monitoring mode search direction instruction means corresponds to, for example, the monitoring mode search direction instruction unit 330.

Moreover, in claim 2, the operation means corresponds to, for example, the operation unit 111.

Moreover, in claim 3, the capture mode direction setting means corresponds to, for example, the capture mode direction setting unit 316.

Moreover, in claim 5, the search direction frequency judgment means corresponds to, for example, the search direction frequency judgment unit 311.

Moreover, in claim 7, the maximum probability judgment means corresponds to, for example, the maximum probability judgment unit 312.

Moreover, in claim 8, the inclination detection means corresponds to, for example, the gravitational direction sensor 103.

Moreover, in claim 9, the monitoring mode direction setting means corresponds to, for example, the monitoring mode direction setting unit 313.

Moreover, in claim 12, the record control means corresponds to, for example, the record control unit 360.

Moreover, in claim 13, the imaging means corresponds to, for example, the imaging unit 10. Moreover, the face detection means corresponds to, for example, the face detection unit 108. Moreover, the capture mode search direction instruction means corresponds to, for example, the capture mode search direction instruction unit 340. Moreover, the monitoring mode search direction instruction means corresponds to, for example, the monitoring mode search direction instruction unit 330. Moreover, the operation means corresponds to, for example, the operation unit 111.

Moreover, in claim 14, the capture mode search direction instruction procedure corresponds to, for example, Step S912 to Step S915. Moreover, the monitoring mode search direction instruction procedure corresponds to, for example, Step S916 to Step S919. Moreover, the mode shift procedure corresponds to Step S911.

Moreover, in claim 15, the capture mode search direction instruction step corresponds to, for example, Step S912 to Step S915. Moreover, the monitoring mode search direction instruction step corresponds to, for example, Step S916 to Step S919. Moreover, the mode shift step corresponds to, for example, Step S911.

In addition, the processing procedures described in the embodiment of the present invention may be grasped as the methods including the series of the procedures. Moreover, the processing procedures may be grasped as the programs for making a computer execute the series of the procedures, or recording media storing the programs.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging apparatus, comprising:
    a face detection unit for searching image data from at least one direction to detect a face portion in the image data;
    a mode for recording an image search direction instruction unit for instructing a search direction of the image data to said face detection unit in a mode for recording an image, which is a mode of recording the image data; and
    a mode for not recording an image search direction instruction unit for instructing the search direction of the image data to said face detection unit in a mode for not recording an image, which is a mode of displaying the image data,
    the search direction of the image data in said mode for not recording an image is determined in a manner different from the manner in which the search direction of the image data in said mode for recording an image is determined.

2. The imaging apparatus according to claim 1, further comprising an operation unit for supplying a signal for selecting the mode for recording an image when an operation to record the image data is received and another signal for selecting the monitor mode when the operation is not received.

3. The imaging apparatus according to claim 1, further comprising a mode for recording an image direction setting unit for setting the search direction of the image data in the mode for recording an image.

4. The imaging apparatus according to claim 1, wherein said mode for not recording an image search direction instruction unit instructs the search direction of the image data in the mode for not recording an image to said face detection unit based on the search direction of the face portion detected by said face detection unit in past.

5. The imaging apparatus according to claim 1, further comprising a search direction frequency judgment unit for judging a frequency of a search direction in which the face portion has been detected by said face detection unit,
wherein said mode for not recording an image search direction instruction unit instructs the search direction of the image data in the mode for not recording an image to said face detection unit based on the frequency.

6. The imaging apparatus according to claim 1, wherein said mode for not recording an image search direction instruction unit instructs the search direction of the image data in the mode for not recording an image to said face detection unit based on the search direction of the face portion detected last time by said face detection unit.

7. The imaging apparatus according to claim 4, further comprising a maximum probability judgment unit for calculating a probability of detecting a face portion based on searches in at least two directions by said face detection unit to judge a search direction in which the probability becomes a maximum,
said mode for not recording an image search direction instruction unit sets a search direction for the mode for not recording an image in which the probability of detecting a face in the image data becomes the maximum.

8. The imaging apparatus according to claim 1, further comprising a gravitational direction sensor for detecting an inclination from a gravitational direction of said imaging apparatus,
wherein said mode for not recording an image search direction instruction unit instructs the search direction of the image data in the mode for not recording an image to said face detection unit based on the inclination.

9. The imaging apparatus according to claim 1, further comprising a mode for not recording an image direction setting unit for setting the search direction of the image data in the mode for not recording an image.

10. The imaging apparatus according to claim 1, wherein said face detection unit performs the search of the image data in at least one direction of a "0 degree" direction, a "+90 degree" direction, a "−90 degree" direction and "180 degree" direction on a supposition that a clockwise direction is a positive direction.

11. The imaging apparatus according to claim 10, wherein said face detection unit detects the face portion in a range of from "+45 degrees" to "−45 degrees" of an inclination of the face portion to each of the "0 degree" direction, the "+90 degree" direction, the "−90 degree" direction and the "180 degree" direction of the image data.

12. The imaging apparatus according to claim 1, further comprising a record control unit for recording a detection result including a number of face portions detected by said face detection unit as information accompanying an image in association with the image data.

13. An imaging apparatus, comprising:
an imaging unit for imaging an image to generate image data;
a face detection unit for searching the image data from at least one direction to detect a face portion in the image data;
a mode for recording an image search direction instruction unit for instructing a search direction of the image data to said face detection unit in a mode for recording an image, which is a mode of recording the image data;
a mode for not recording an image search direction instruction unit for instructing the search direction of the image data to said face detection unit in a mode for not recording an image, which is a mode of displaying the image data; and
an operation unit for supplying a signal for selecting the mode for recording an image when said operation unit receives an operation to record the image data and a signal for selecting the mode for not recording an image when said operation unit does not receive the operation,
the search direction of the image data in said mode for not recording an image is determined in a manner different from the manner in which the search direction of the image data in said mode for recording an image is determined.

14. A processing method for an imaging apparatus including a face detection unit for searching image data from at least one direction to detect a face portion in the image data, and an operation unit for performing an operation to record the image data, said method comprising using a processor to perform:
a mode for recording an image search direction instruction procedure instructing a search direction of the image data to said face detection unit in a mode for recording an image, which is a mode of recording the image data;
a mode for not recording an image search direction instruction procedure instructing the search direction of the image data to said face detection unit in a mode for not recording an image, which is a mode of displaying the image data; and
a mode shift procedure performing a shift to the mode for recording an image at a time of receiving the operation and continuing the mode for not recording an image at a time of not receiving the operation,
the search direction of the image data in said mode for not recording an image is determined in a manner different from the manner in which the search direction of the image data in said mode for recording an image is determined.

15. A computer-readable medium storing a computer-readable program executable by an imaging apparatus including a face detection unit for searching image data from at least one direction to detect a face portion in the image data, and an operation unit for performing an operation to record the image data, said program comprising the steps of:
a mode for recording an image search direction instruction step of instructing a search direction of the image data to said face detection unit in a mode for recording an image, which is a mode of recording the image data;
a mode for not recording an image search direction instruction step of instructing the search direction of the image data to said face detection unit in a mode for not recording an image, which is a mode of displaying the image data; and
a mode shift step of performing a shift to the mode for recording an image at a time of receiving the operation and continuing the mode for not recording an image at a time of not receiving the operation,
the search direction of the image data in said mode for not recording an image is determined in a manner different from the manner in which the search direction of the image data in said mode for recording an image is determined.

16. The imaging apparatus according to claim 1, wherein when operating in the mode for not recording an image the apparatus does not search the image data in any direction for which a search would be useless or substantially useless.

* * * * *